(12) United States Patent
Kato et al.

(10) Patent No.: US 10,956,805 B2
(45) Date of Patent: Mar. 23, 2021

(54) RFID TAG, ARTICLE INCLUDING RFID TAG, AND METHOD OF MANUFACTURING ARTICLE

(71) Applicant: Murata Manufacturing Co., Ltd., Nagaokakyo (JP)

(72) Inventors: Noboru Kato, Nagaokakyo (JP); Jo Onodera, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 56 days.

(21) Appl. No.: 16/412,871

(22) Filed: May 15, 2019

(65) Prior Publication Data

US 2019/0266468 A1 Aug. 29, 2019

Related U.S. Application Data

(63) Continuation of application No. PCT/JP2018/043368, filed on Nov. 26, 2018.

(30) Foreign Application Priority Data

Jan. 23, 2018 (JP) .............................. JP2018-008823

(51) Int. Cl.
*G06K 19/077* (2006.01)
*G06K 19/02* (2006.01)
*H01Q 7/06* (2006.01)
*H01Q 1/22* (2006.01)

(52) U.S. Cl.
CPC ..... *G06K 19/07781* (2013.01); *G06K 19/027* (2013.01); *H01Q 1/2225* (2013.01); *H01Q 7/06* (2013.01)

(58) Field of Classification Search
CPC ........ G06K 19/00; G06K 19/04; G06K 19/06; G06K 19/07
USPC ................................ 235/492, 380, 487, 375
See application file for complete search history.

(56) References Cited

U.S. PATENT DOCUMENTS

| 2005/0007296 | A1* | 1/2005 | Endo ................ G06K 19/07749 343/895 |
| 2005/0179552 | A1* | 8/2005 | Shoji ................ G06K 19/07779 340/572.7 |
| 2013/0206845 | A1* | 8/2013 | Koujima .................. H01Q 7/08 235/492 |
| 2014/0253404 | A1 | 9/2014 | Ikemoto et al. |

(Continued)

FOREIGN PATENT DOCUMENTS

| JP | 2013206080 A | 10/2013 |
| JP | 2014067234 A | 4/2014 |

(Continued)

OTHER PUBLICATIONS

International Search Report issued for PCT/JP2018/043368, dated Jan. 29, 2019 (in Japanese).

(Continued)

*Primary Examiner* — Edwyn Labaze
(74) *Attorney, Agent, or Firm* — Arent Fox LLP

(57) ABSTRACT

An RFID tag 10 attachable to an article in use that includes an RFIC module including an RFIC chip and a helical coil connected to the RFIC chip, and an antenna member that is a threadlike conductor having a portion helically wound on the RFIC module around a winding axis extending parallel to an extending direction of a coil axis of the helical coil.

17 Claims, 18 Drawing Sheets

(56) References Cited

U.S. PATENT DOCUMENTS

| | | | |
|---|---|---|---|
| 2014/0291409 A1* | 10/2014 | Nitta | G06K 19/07758 |
| | | | 235/492 |
| 2014/0326791 A1 | 11/2014 | Ishida et al. | |
| 2016/0126631 A1 | 5/2016 | Yosui et al. | |
| 2018/0204104 A1* | 7/2018 | Naruse | G06K 19/07345 |
| 2019/0229396 A1* | 7/2019 | Hubinak | H01Q 7/06 |

FOREIGN PATENT DOCUMENTS

| | | |
|---|---|---|
| JP | 5912398 A | 4/2016 |
| WO | 2013115158 A1 | 8/2013 |
| WO | 2014141906 A1 | 9/2014 |
| WO | 2015008704 A1 | 1/2015 |
| WO | 2018101315 A1 | 6/2018 |

OTHER PUBLICATIONS

Written Opinion of the International Searching Authority issued for PCT/JP2018/043368, dated Jan. 29, 2019.

\* cited by examiner

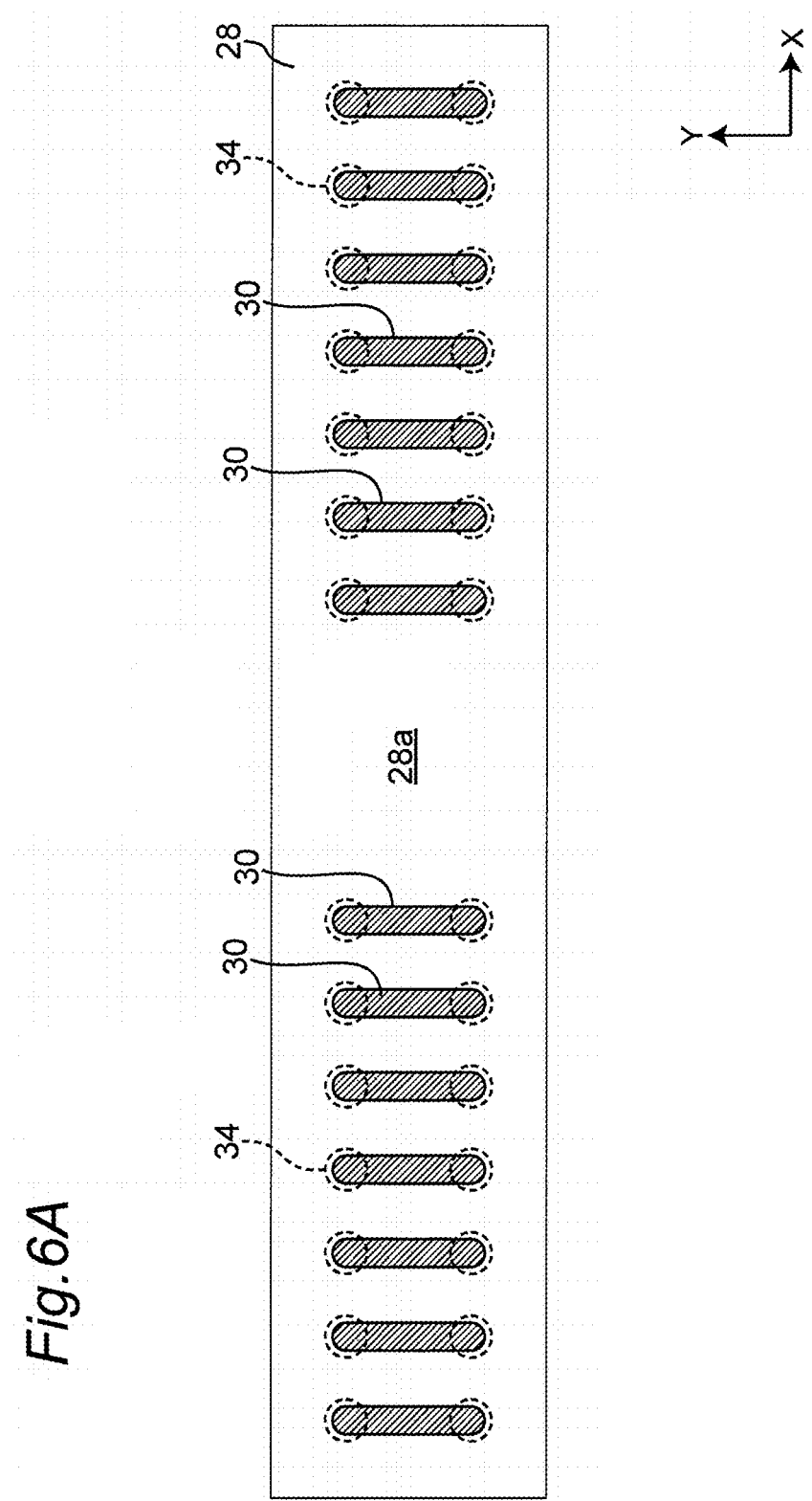

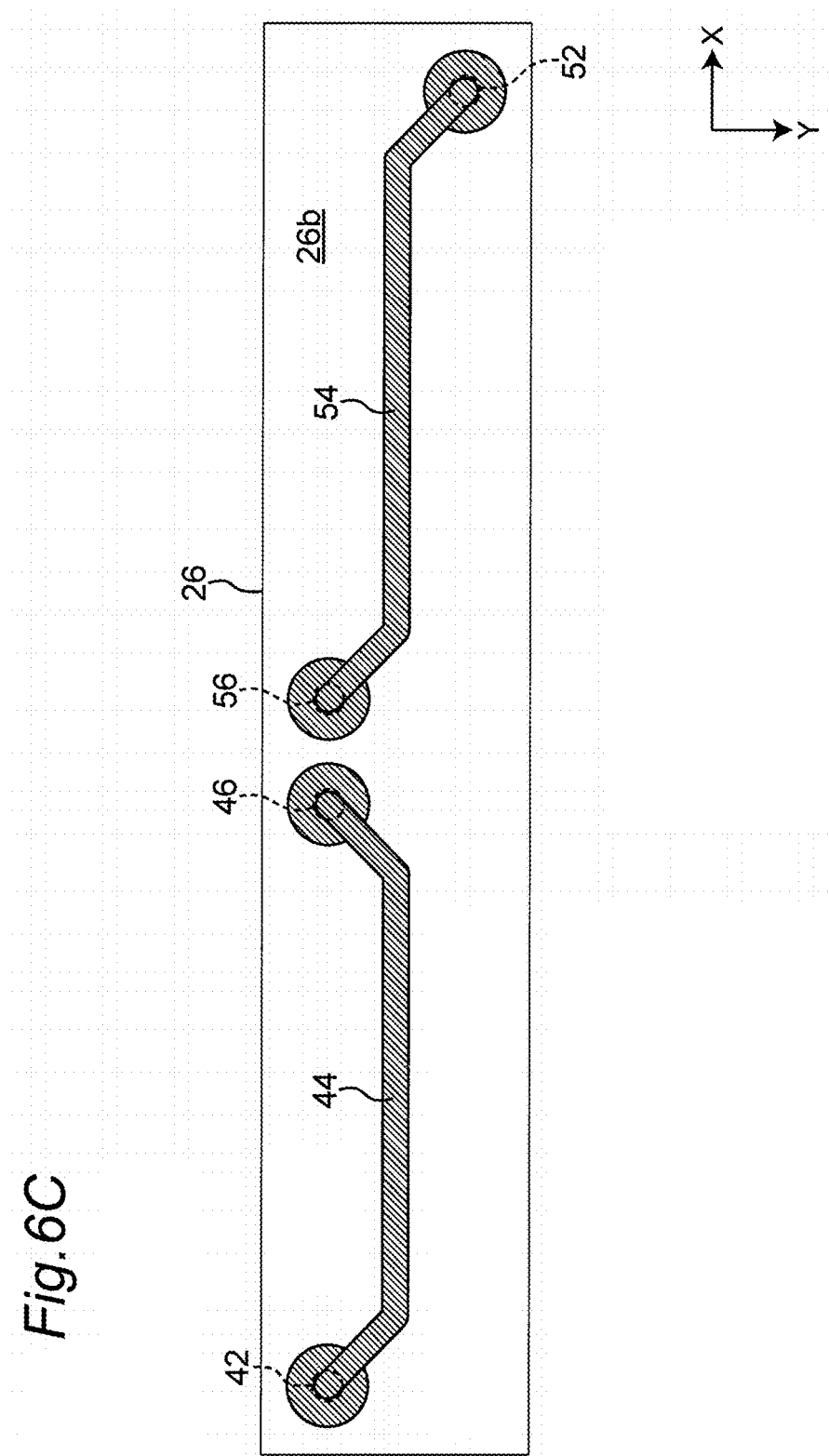

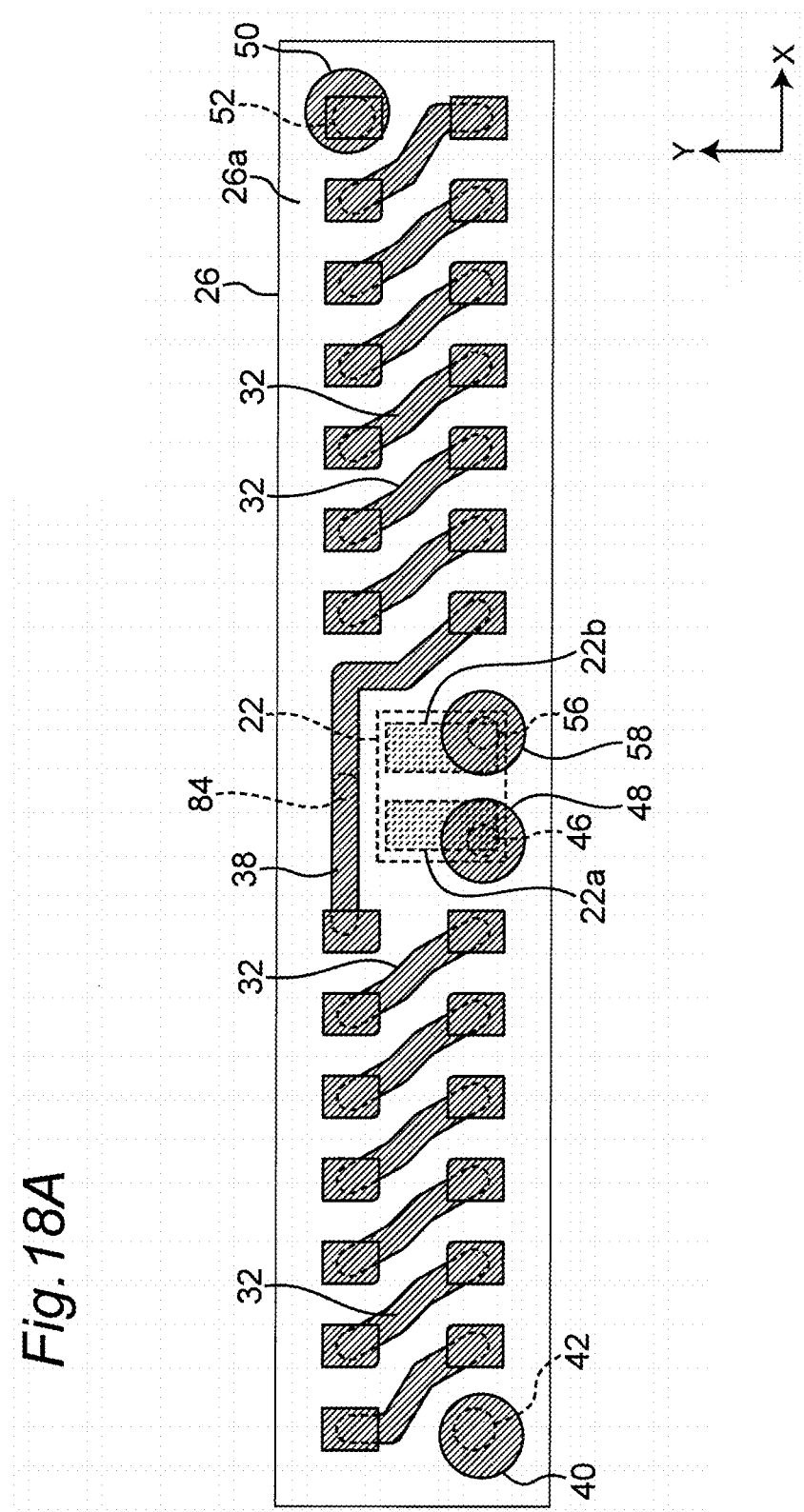

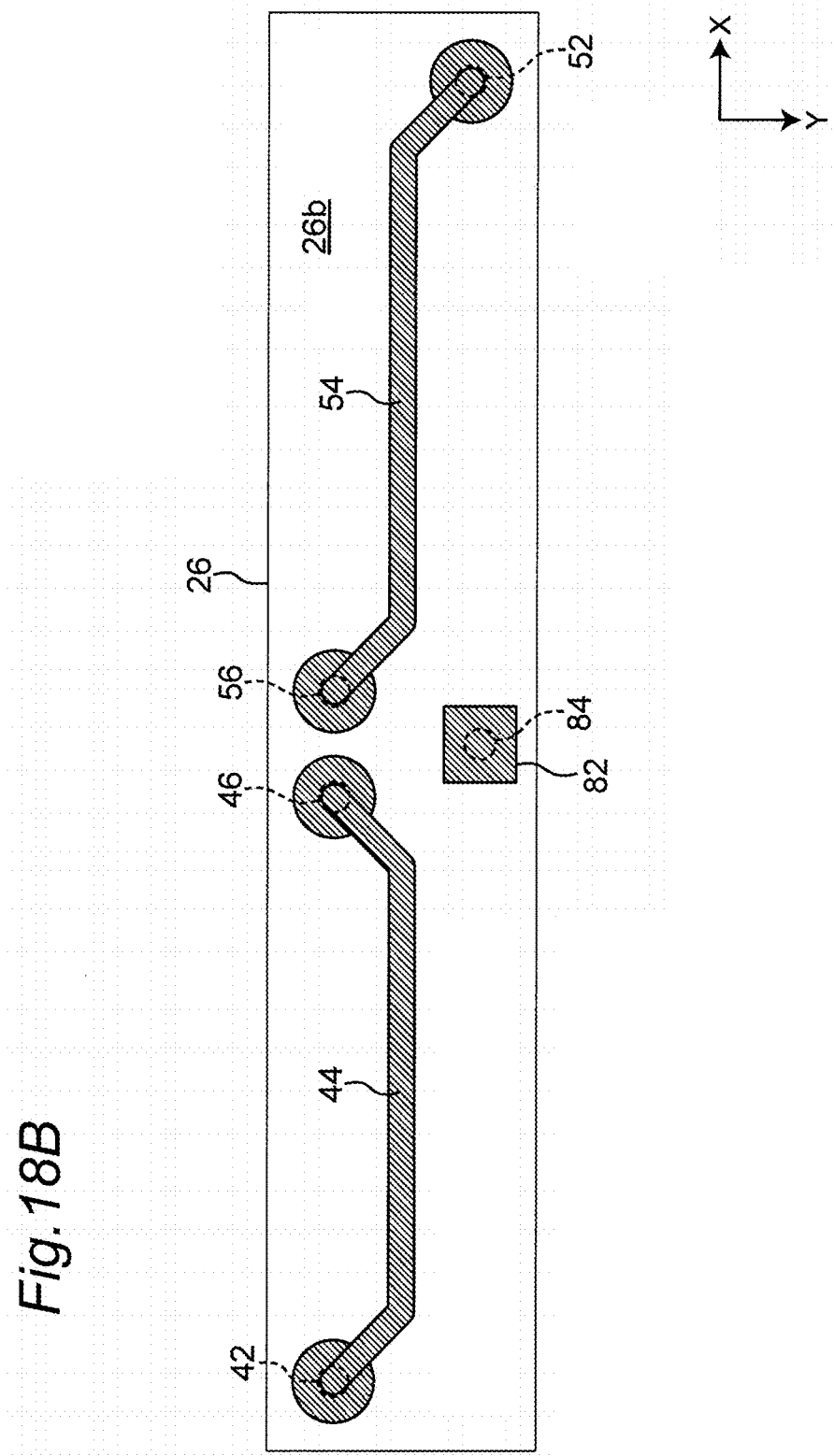

RFID TAG, ARTICLE INCLUDING RFID TAG, AND METHOD OF MANUFACTURING ARTICLE

CROSS REFERENCE TO RELATED APPLICATIONS

The present application is a continuation of PCT/JP2018/043368 filed Nov. 26, 2018, which claims priority to Japanese Patent Application No. 2018-008823, filed Jan. 23, 2018, the entire contents of each of which are incorporated herein by reference.

TECHNICAL FIELD

The present disclosure relates to an RFID tag attachable to a cloth product such as linen, an article including the RFID tag, and a method of manufacturing the article.

BACKGROUND

RFID (Radio-Frequency IDentification) tags attached to cloth products such as linen in use are conventionally known. For example, the RFID tag described in Patent Document 1 (identified below) has a main antenna sewn on a cloth product, and a loop antenna connected to a semiconductor device and disposed near the main antenna. A magnetic field coupling between the main antenna and the loop antenna causes the RFID tag to perform wireless communication.

Patent Document 1: Japanese Patent No. 5912398.

However, in the case of the RFID tag described in Patent Document 1, a degree of coupling between the main antenna and the loop antenna is small, so that a long communication distance cannot be ensured.

SUMMARY OF THE INVENTION

Therefore, a problem to be solved by the present invention is to allow an RFID tag attached to an article that is a cloth product such as linen in use to achieve a an increased communication distance.

According, an exemplary aspect of the present disclosure provides an RFID tag comprising an RFIC module including an RFIC chip and a helical coil connected to the RFIC chip; and an antenna member that is a threadlike conductor having a portion helically wound on the RFIC module around a winding axis extending parallel to an extending direction of a coil axis of the helical coil.

Another exemplary aspect of the present disclosure provides an article comprising an RFID tag, wherein the RFID tag includes an RFIC module including an RFIC chip and a helical coil connected to the RFIC chip, and an antenna member that is a threadlike conductor having a portion helically wound on the RFIC module around a winding axis extending parallel to an extending direction of a coil axis of the helical coil and a remaining portion sewn to the article.

Another exemplary aspect of the present disclosure provides a method of manufacturing an article having an RFID tag, comprising helically winding a portion of an antenna member that is a threadlike conductor on an RFIC module including an RFIC chip and a helical coil connected to the RFIC chip around a winding axis extending parallel to an extending direction of a coil axis of the helical coil; and sewing a remaining portion of the antenna member to the article.

The exemplary embodiments of the present disclosure enable the RFID tag attached to an article that is a cloth product such as linen in use to achieve an increased communication distance.

BRIEF DESCRIPTION OF DRAWINGS

FIG. 6A is a view showing a conductor pattern formed on a top surface of a resin block body in the RFIC module.

FIG. 6C is a view showing a conductor pattern formed on a back surface of the printed wiring board in the RFIC module.

FIG. 18A is a view showing a conductor pattern formed on the principal surface of the printed wiring board in the RFID tag shown in FIG. 17.

FIG. 18B is a view showing a conductor pattern formed on a back surface of the printed wiring board in the RFID tag shown in FIG. 17.

DETAILED DESCRIPTION OF EXEMPLARY EMBODIMENTS

Figure 1:
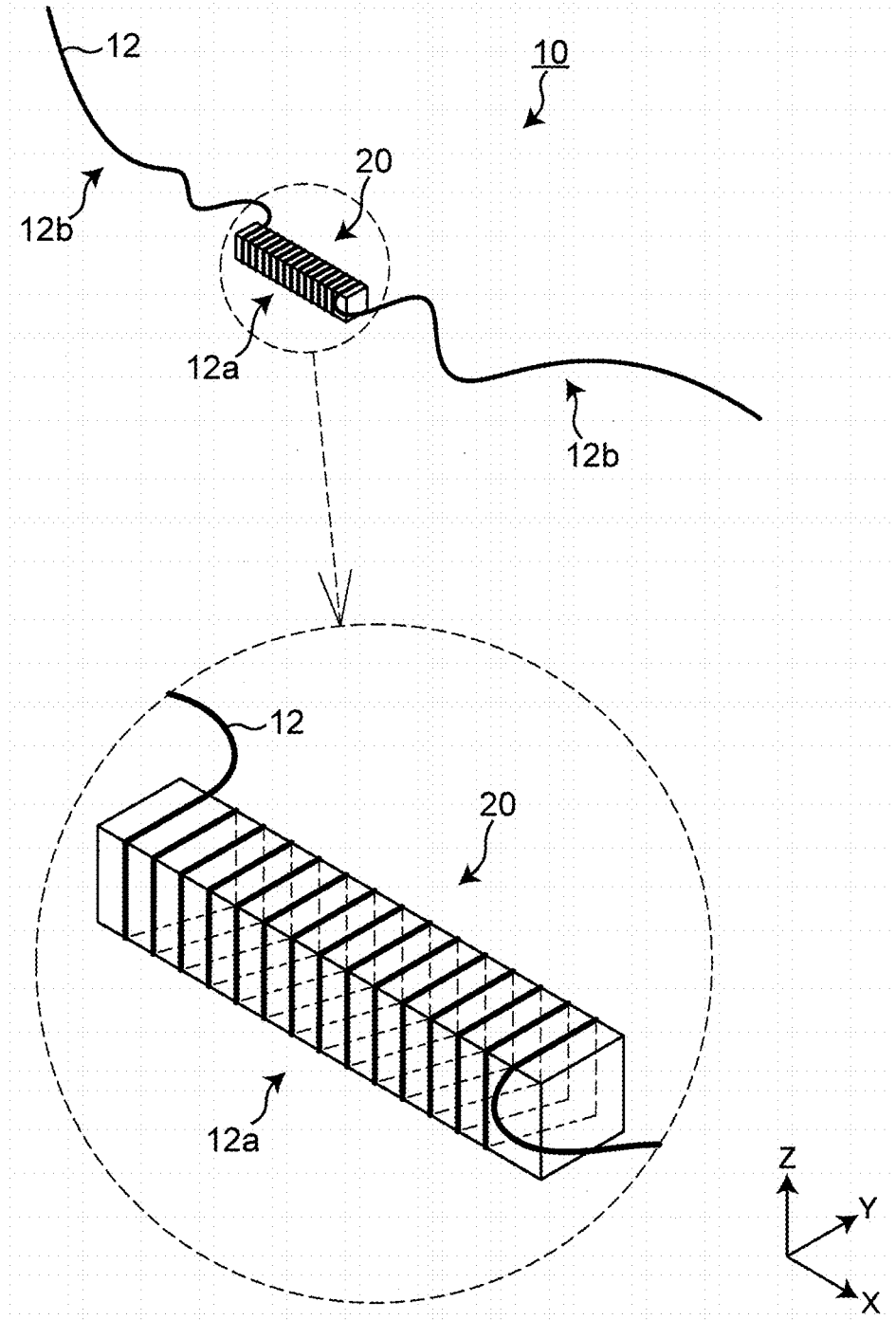
FIG. 1 is a perspective view of an RFID tag according to an exemplary embodiment of the present disclosure.

An RFID tag according to an exemplary aspect of the present disclosure comprises an RFIC module including an RFIC chip and a helical coil connected to the RFIC chip, and an antenna member that is a threadlike conductor having a portion helically wound on the RFIC module around a winding axis extending parallel to an extending direction of a coil axis of the helical coil.

According to this aspect, an increased communication distance can be achieved by the RFID tag attached to an article that is a cloth product such as linen in use.

In an exemplary aspect, the RFIC module may include an insulating element body; the RFIC chip and the helical coil may be built in the insulating element body; and a portion of the antenna member may be wound on the insulating element body. The RFIC chip and the helical coil are protected by the insulating element body. The portion of the antenna member can be wound around the insulating element body.

In an exemplary aspect, the RFIC module may have a shape including a longitudinal direction, and the winding axis of the antenna member may extend parallel to the longitudinal direction of the RFIC module. As a result, the antenna member can be wound around the RFIC module for a larger number of turns.

In an exemplary aspect, the RFID tag may comprise a spool-shaped member housing the RFIC module and having the antenna member wound there around, and the spool-shaped member has both ends each provided with a thread retaining part for fixing the antenna member to the spool-shaped member. The antenna member is wound around the spool-shaped member and fixed by the thread retaining part. The RFIC module is protected by the spool-shaped member.

An article according to another exemplary aspect of the present disclosure is an article comprising an RFID tag, wherein the RFID tag includes an RFIC module including an RFIC chip and a helical coil connected to the RFIC chip, and an antenna member that is a threadlike conductor having a portion helically wound on the RFIC module around a winding axis extending parallel to an extending direction of a coil axis of the helical coil and a remaining portion sewn to the article.

According to this exemplary aspect, an increased communication distance can be achieved by the RFID tag attached to an article that is a cloth product such as linen in use.

A method of manufacturing an article according to another exemplary aspect of the present disclosure is a method of manufacturing an article having an RFID tag, comprising: helically winding a portion of an antenna member that is a threadlike conductor on an RFIC module including an RFIC chip and a helical coil connected to the RFIC chip around a winding axis extending parallel to an extending direction of a coil axis of the helical coil; and sewing a remaining portion of the antenna member to the article.

According to this exemplary aspect, an increased communication distance can be achieved by the RFID tag attached to an article that is a cloth product such as linen in use.

Exemplary embodiments of the present disclosure will now be described with reference to the drawings.

Figure 2:
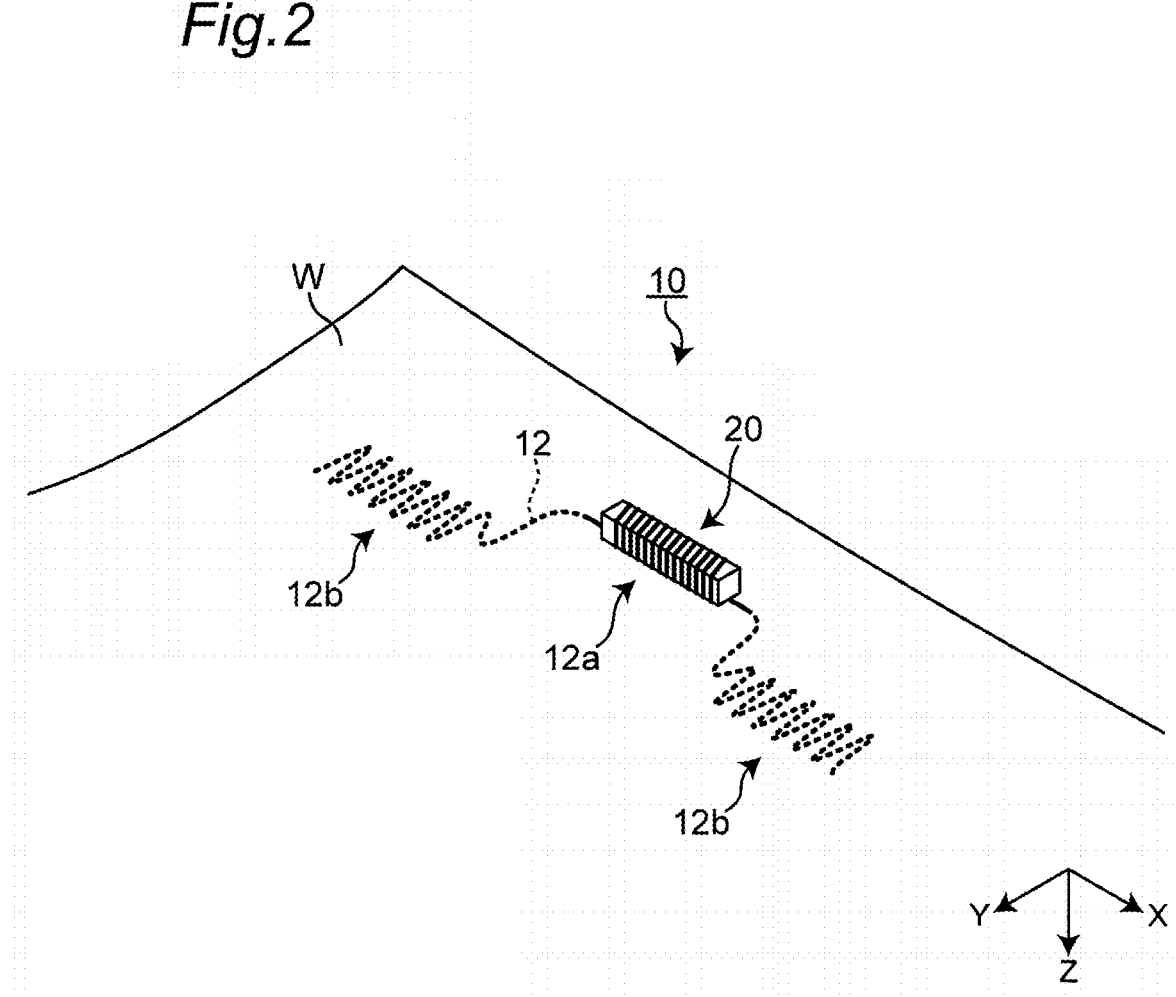
FIG. 2 is a perspective view of a portion of an article with the RFID tag attached.

FIG. 1 is a perspective view showing an RFID (Radio-Frequency IDentification) tag according to an exemplary embodiment of the present disclosure. FIG. 2 shows a portion of an article with the RFID tag attached. It is noted that an X-Y-Z coordinate system shown in the figures is for facilitating understanding of the exemplary embodiments and does not limit the invention.

As shown in FIG. 1, an RFID tag 10 is a wireless communication device configured for wireless communication at a communication frequency in the UHF band, for example, and has a threadlike antenna member 12 and an RFIC (Radio-Frequency Integrated Circuit) module 20 on which a portion of the antenna member 12 is wound.

The antenna member 12 is a conductor configured to function as an antenna of the RFID tag 10 and is a freely deformable threadlike conductor coated with an insulating material such as resin, for example. As shown in FIG. 2, the antenna member 12 is a threadlike conductor that can be sewn into an arbitrary sewing pattern on an article W that is a cloth product such as linen. For example, the antenna member 12 is a threadlike conductor made of copper or silver/stainless steel having a cross-sectional diameter of 0.05 to 0.3 mm. When the article W is washed and the antenna member 12 is an uncoated wire, the antenna member 12 is preferably made of a material such as stainless steel resistant to rust and hardly broken. The antenna member 12 may be a twisted wire formed by twisting multiple threadlike conductors, instead of one threadlike conductor. The antenna member 12 may be a slit tape yarn, a covering yarn, etc. Furthermore, the antenna member 12 may be formed by applying copper plating or silver plating to a yarn material having high tensile strength and heat resistance such as aramid yarn.

According to the exemplary embodiment, as shown in FIG. 2, the antenna member 12 includes in a central portion thereof a helical coupling part 12a helically wound around the RFIC module 20. Each of radiation parts 12b of the antenna member 12 is a portion excluding the helical coupling part 12a and is configured as an antenna and can be sewn to the article W into a meander shape. As a result, the RFID tag 10 is fixed to the article W, as a wireless communication device including a meander-shaped antenna.

After winding a portion of the antenna member 12 (i.e., the portion serving as the helical coupling part 12a) around the RFIC module 20, the remaining portions of the antenna member 12 (i.e., the portions serving as the radiation parts 12b) are sewn to the article W. Alternatively, the helical coupling part 12a of the antenna member 12 may also be sewn to the article W while being wound around the RFIC module 20. For example, after fixing the RFIC module 20 to the article W with an adhesive etc., a portion of the antenna member 12 serving as the helical coupling part 12a is sewn to the article W in a winding manner around the RFIC module 20.

The helical coupling part 12a of the antenna member 12 wound around the RFIC module 20 may be fixed to the RFIC module 20 by an adhesive. As a result, the pitch intervals of the antenna members 12 are maintained constant in the helical coupling part 12a of the antenna member 12 wound into a helical shape, and the communication characteristics of the RFID tag 10 are stabilized. Alternatively, the RFIC module 20 with the antenna member 12 wound there around may be fixed to the article W while being sealed by a potting resin, for example.

According to the exemplary embodiment, the length of each of the radiation parts 12b on both sides of the helical coupling part 12a in the antenna member 12 is approximately ¼ of the wavelength of the communication frequency used by the RFID tag 10. Therefore, the length of the portion of the antenna member 12 excluding the helical coupling part 12a is approximately ½ of the wavelength. As a result, the antenna member 12 can be configured as a half-wavelength dipole antenna.

As shown in FIG. 1, the RFIC module 20 is a substantially rectangular parallelepiped block body having a longitudinal direction (X-axis direction), and the helical coupling part 12a of the threadlike antenna member 12 is helically wound. Specifically, the helical coupling part 12a of the antenna member 12 is helically wound on the RFIC module 20 around a winding axis extending substantially parallel to the longitudinal direction (X-axis direction) of the RFIC module 20. Therefore, the helical coupling part 12a of the antenna member 12 is maintained in a helical coil shape by the RFIC module 20. It is noted that this can increase the number of turns as compared to the case of winding around a winding axis extending in the lateral direction of the RFIC module 20, so that the helical coupling part 12a can generate a stronger magnetic field (i.e., it can form magnetic field coupling at a large degree of coupling to a helical coil of the RFIC module 20 described later).

Details of the RFIC module 20 will hereinafter be described with reference to the drawings.

Figure 3:
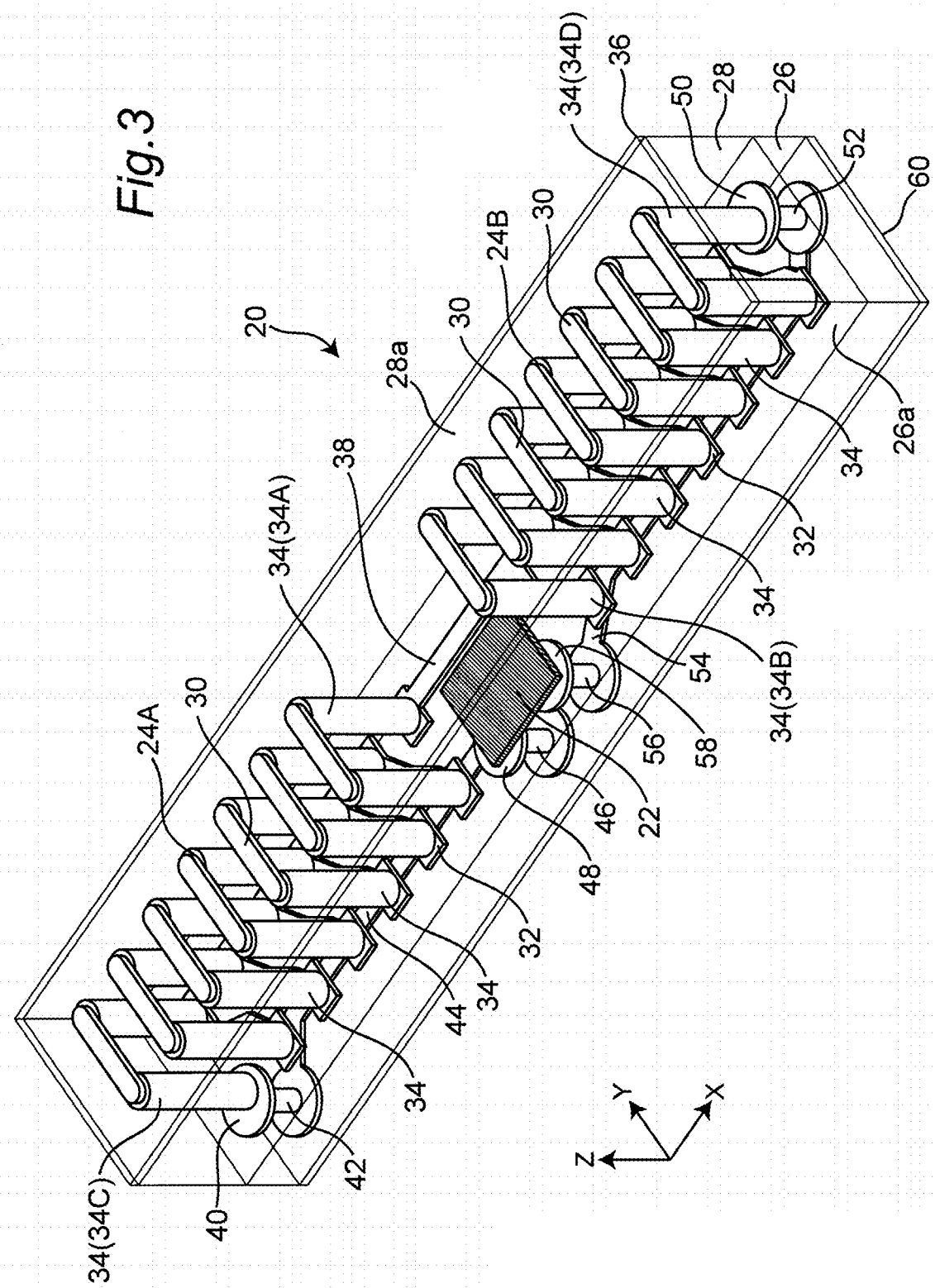
FIG. 3 is a perspective view showing an internal configuration of an RFIC module.
Figure 4:
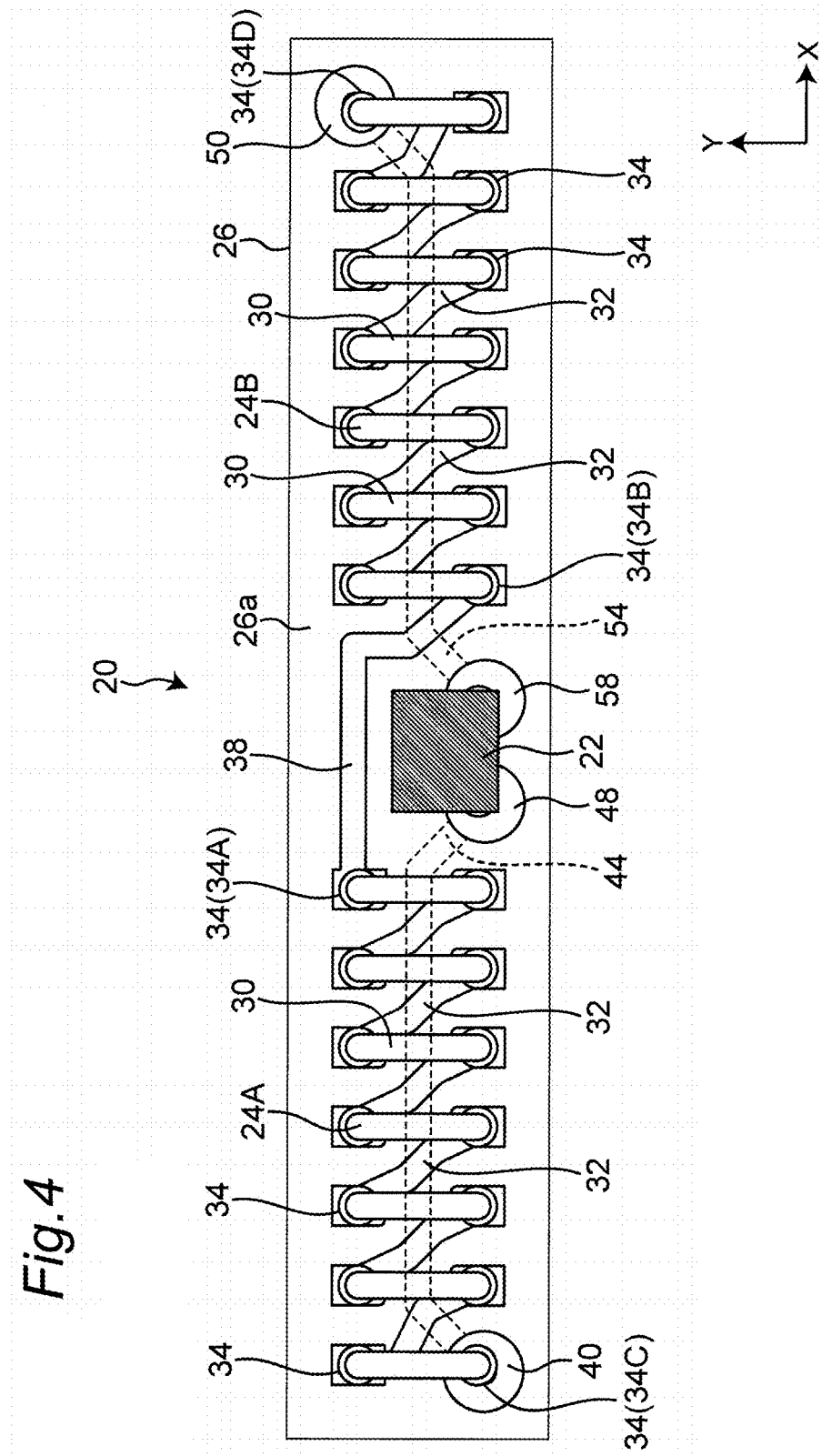
FIG. 4 is a top view of the RFIC module.
Figure 5:
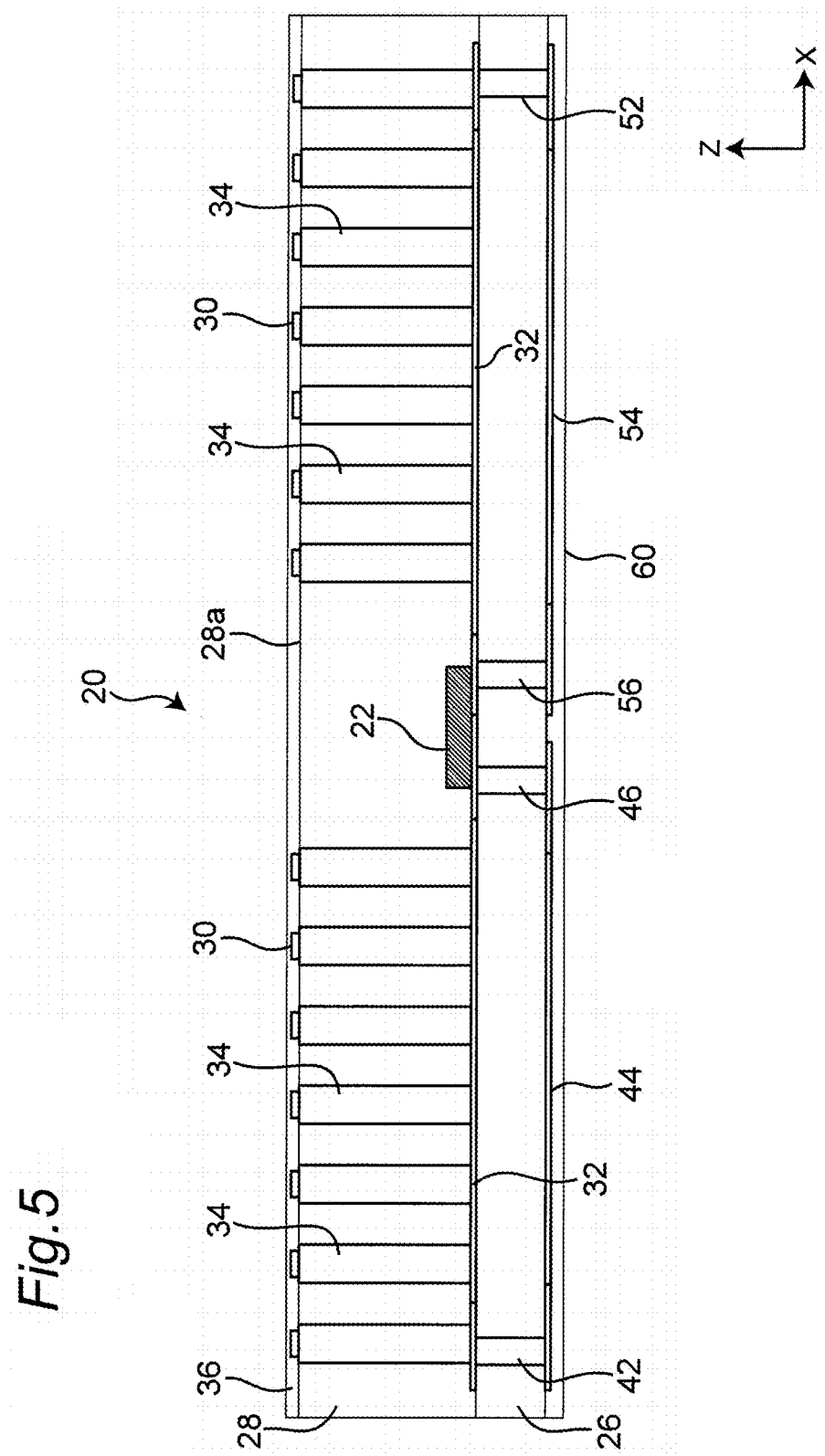
FIG. 5 is a cross-sectional view of the RFIC module.

FIG. 3 is a perspective view showing an internal configuration of the RFIC module, and FIG. 4 is a top view showing the internal configuration of the RFIC module. FIG. 5 is a cross-sectional view of the RFIC module.

As shown in FIG. 3, the RFIC module 20 has a substantially rectangular parallelepiped shape of about 1.0 mm square with a length of about 5.0 to 6.0 mm (length in the X-axis direction). The RFIC module 20 includes an RFIC chip 22 and helical coils 24A, 24B connected to the RFIC chip 22.

According to the exemplary embodiment, the RFIC module 20 has a printed wiring board 26 made of an insulating material, and the RFIC chip 22 and the helical coils 24A, 24B are disposed on a principal surface 26a of the printed wiring board 26. The RFIC chip 22 and the helical coils 24A, 24B on the principal surface 26a of the printed wiring board 26 are buried in and protected by a hard resin block body 28 made of a thermosetting resin such as epoxy resin formed on the principal surface 26a. Therefore, the printed wiring board 26 and the resin block body 28 form a main body (i.e., an insulating element body) of the RFIC module 20 made of the insulating material, and the RFIC chip 22 and the helical coils 24A, 24B are built into the main body with the antenna member 12 wound there around.

Moreover, the RFIC chip 22 is an IC chip and is configured to communicate with an external communication device (e.g., a reader/writer device for the RFID tag 10) via the antenna member 12. In this exemplary embodiment, the RFIC chip 22 is disposed at the center of the principal surface 26a of the printed wiring board 26 in the longitudinal direction (X-axis direction) as shown.

According to the exemplary embodiment, the helical coils 24A, 24B are connected to the RFIC chip 22 and disposed on both sides of the RFIC chip 22 in the longitudinal direction (X-axis direction) of the RFIC module 20. In the case of this embodiment, the helical coils 24A, 24B are made up of multiple conductor patterns 30, multiple conductor patterns 32, and multiple metal pins 34.

The multiple conductor patterns 30 are conductors forming portions of the helical coils 24A, 24B and are formed on a top surface 28a (surface farthest from the printed wiring board 26) of the resin block body 28 as shown in FIG. 6A. The multiple conductor patterns 30 are covered and protected by a protective layer 36 formed on the top surface 28a of the resin block body 28.

Figure 6B:
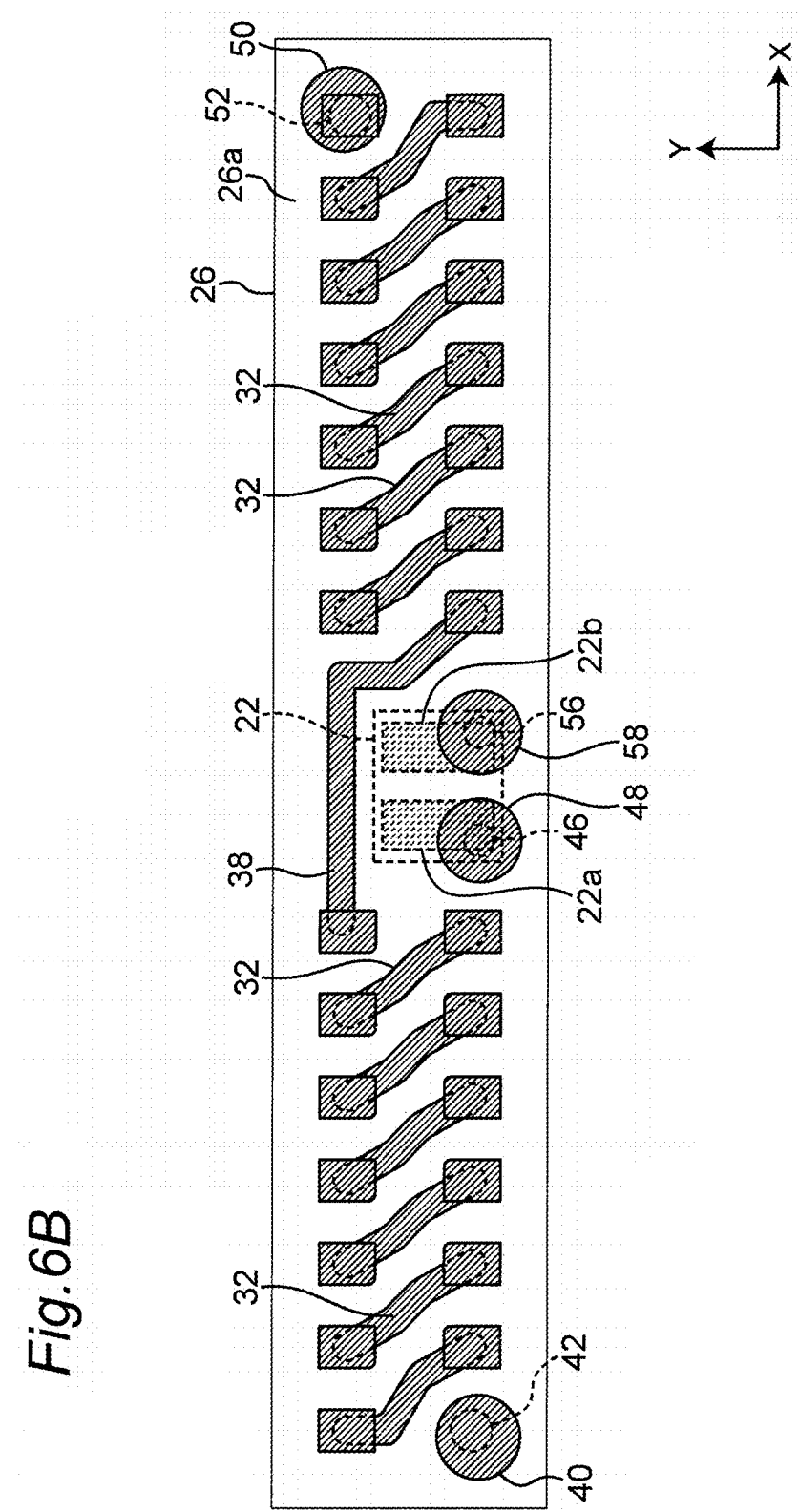
FIG. 6B is a view showing a conductor pattern formed on a principal surface of a printed wiring board in the RFIC module.

The multiple conductor patterns 32 are conductors forming portions of the helical coils 24A, 24B and are formed on the principal surface 26a of the printed wiring board 26 as shown in FIG. 6B.

In an exemplary aspect, these conductor patterns 30, 32 are made of a conductive material such as copper, for example. For example, the conductor patterns 30, 32 are formed by forming a copper film and patterning the copper film by photoresist, etching, and the like. Alternatively, the conductor patterns 30, 32 may be formed by screen printing of a conductive paste.

The multiple metal pins 34 are conductors forming portions of the helical coils 24A, 24B and penetrate the resin block body 28 to connect the conductor patterns 30 on the top surface 28a of the resin block body 28 and the conductor patterns 32 on the principal surface 26a of the printed wiring board 26 as shown in FIG. 5. The metal pins 34 are columnar conductors and, for example, columnar copper pins. The metal pins 34 may not necessarily have a circular cross-sectional shape.

Specifically, one of the conductor patterns 30, one of the conductor patterns 32, and two of the metal pins 34 form one loop in the helical coils 24A, 24B.

Each of the helical coils 24A, 24B configured in this way is disposed in the RFIC module 20 such that an opening thereof is directed in the longitudinal direction (i.e., the X-axis direction) of the RFIC module 20, in other words, such that a coil axis extends substantially parallel to the longitudinal direction.

Furthermore, the other end of the helical coil 24A (i.e., the metal pin 34 (34A) on the center side in the longitudinal direction (X-axis direction) of the RFIC module 20) is connected to one end of the helical coil 24B (the metal pin 34 (34B) on the center side in the longitudinal direction) by a conductor pattern 38. The conductor pattern 38 is formed on the principal surface 26a of the printed wiring board 26 as with the multiple conductor patterns 32.

Furthermore, one end of the helical coil 24A (the metal pin 34 (34C)) on the outer side in the longitudinal direction (X-axis direction) of the RFIC module 20) is connected to a first input/output terminal 22a of the RFIC chip 22 shown in FIG. 6B. Specifically, as shown in FIGS. 3 and 4, the metal pin 34 (34C) is one end of the helical coil 24A and is connected to a conductor pattern (land) 40 on the principal surface 26a of the printed wiring board 26. As further shown, the land 40 is connected via an interlayer connection conductor 42 such as a through-hole conductor penetrating the printed wiring board 26 to one end of a conductor pattern 44 formed on a back surface 26b of the printed wiring board 26 (see FIG. 6C, for example). The other end of the conductor pattern 44 is connected via an interlayer connection conductor 46 to a conductor pattern (land) 48 formed on the principal surface 26a of the printed wiring board 26. As shown in FIG. 6B, the first input/output terminal 22a of the RFIC chip 22 is connected to the land 48 by solder etc.

On the other hand, the other end of the helical coil 24B (the metal pin 34 (34D)) on the outer side in the longitudinal direction (X-axis direction) of the RFIC module 20) is connected to a second input/output terminal 22b of the RFIC chip 22 shown in FIG. 6B. Specifically, as shown in FIGS. 3 and 4, the metal pin 34 (34D) is the other end of the helical coil 24B and is connected to a conductor pattern (land) 50 on the principal surface 26a of the printed wiring board 26. The land 50 is connected via an interlayer connection conductor 52 to one end of a conductor pattern 54 formed on the back surface 26b of the printed wiring board 26 (see FIG. 6C). The other end of the conductor pattern 54 is connected via an interlayer connection conductor 56 to a conductor pattern (land) 58 formed on the principal surface 26a of the printed wiring board 26. As shown in FIG. 6B, the second input/output terminal 22b of the RFIC chip 22 is connected to the land 58 by solder etc.

The conductor patterns 44, 54 disposed on the back surface 26b of the printed wiring board 26 as shown in FIGS. 3 and 5 are formed by the same method as the conductor patterns 32 disposed on the principal surface 26a. The conductor patterns 44, 54 are covered and protected by a protective layer 60 formed on the back surface 26b of the printed wiring board 26.

Figure 7:
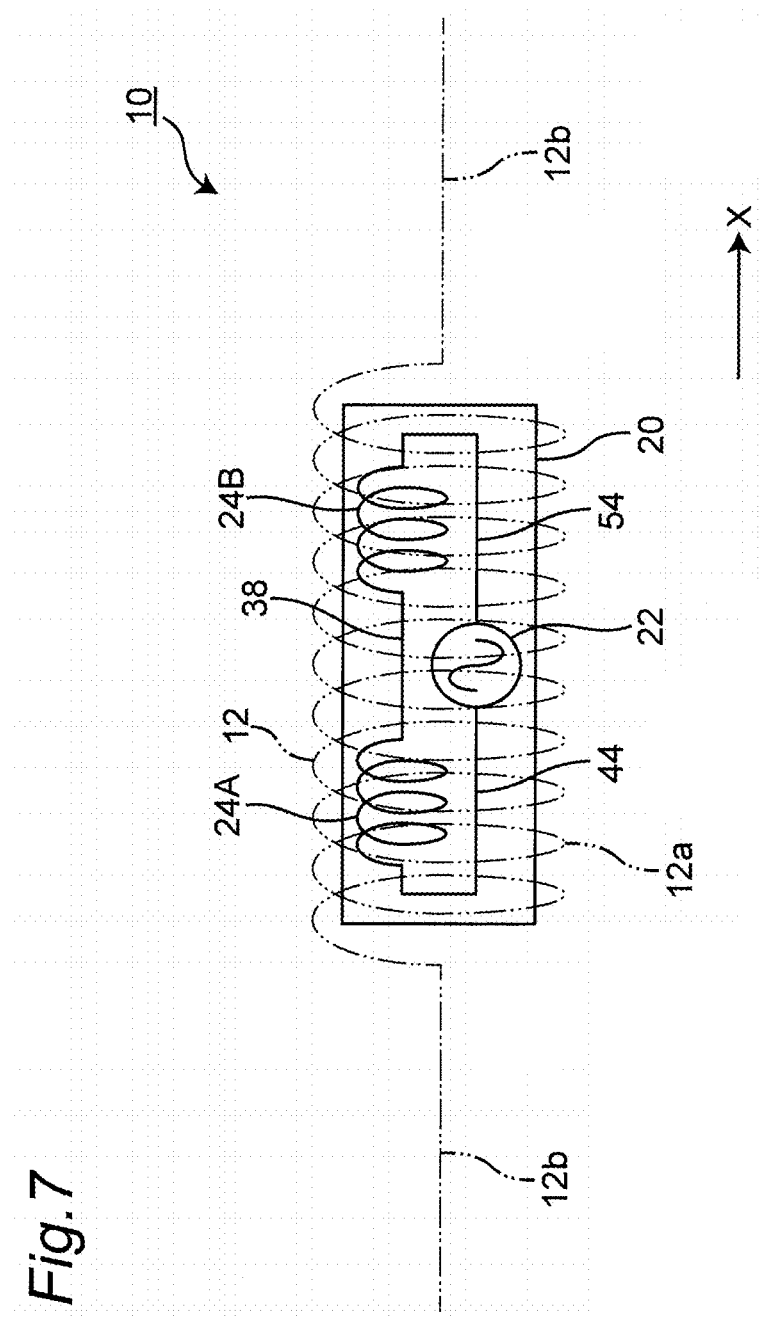
FIG. 7 is an equivalent circuit diagram of the RFID tag.

FIG. 7 is an equivalent circuit diagram of the RFID tag 10.

As described above, the RFIC module 20 has the helical coils 24A, 24B built-in, and the helical coupling part 12a of the antenna member 12 is helically wound around the RFIC module 20. Therefore, as shown in FIG. 7, the helical coils 24A, 24B of the RFIC module 20 are arranged inside the helical coupling part 12a of the antenna member 12. Additionally, both the winding axis of the helical coupling part 12a of the antenna member 12 and the coil axis of the helical coils 24A, 24B are substantially parallel to the longitudinal direction (X-axis direction) of the RFIC module 20. Therefore, the winding axis and the coil axis are substantially parallel. Due to such arrangement, the helical coupling part 12a of the antenna member 12 and the helical coils 24A, 24B can form the magnetic field coupling at a large degree of coupling.

Specifically, when the radiation parts 12b of the antenna member 12 receive an electric wave (signal) from the outside (e.g., a reader/writer device for the RFID tag 10), a current is generated (induced) in the antenna member 12, causing the helical coupling part 12a to generate a magnetic field. A magnetic flux in the helical coupling part 12a passes through the helical coils 24A, 24B built in the RFIC module 20. As a result, a current is generated (induced) in the helical coils 24A, 24B, and the RFIC chip 22 is driven by the current.

The driven RFIC chip 22 supplies a signal (current) corresponding to information stored in an internal storage part (memory) thereof to the helical coils 24A, 24B, causing the helical coils 24A, 24B to generate a magnetic field. The magnetic flux in the helical coils 24A, 24B passes through the inside of the helical coupling part 12a of the antenna member 12. As a result, a current is generated (induced) in the antenna member 12, so that electric waves are emitted from the radiation parts 12b of the antenna member 12.

Since the helical coils 24A, 24B of the RFIC module 20 are arranged inside the helical coupling part 12a of the antenna member 12, and the winding axis of the helical coupling part 12a is substantially parallel to the coil axis of the helical coils 24A, 24B, the magnetic flux generated inside one of the helical coupling part 12a and the helical coils 24A, 24B passes through the other. As a result, the helical coupling part 12a and the helical coils 24A, 24B can form the magnetic field coupling with a large degree of coupling. For example, the magnetic field coupling can be achieved at a higher degree of coupling as compared to when a loop is used instead of the helical coils 24A, 24B. Since the magnetic field coupling is formed at a large degree of coupling, the RFID tag 10 can achieve an increased communication distance.

According to this exemplary embodiment as described above, a long communication distance can be achieved by the RFID tag attached to an article that is a cloth product such as linen in use.

Although the present invention has been described with reference to the exemplary embodiment above, it is noted that the exemplary embodiments of the present invention are not limited thereto.

Figure 8:
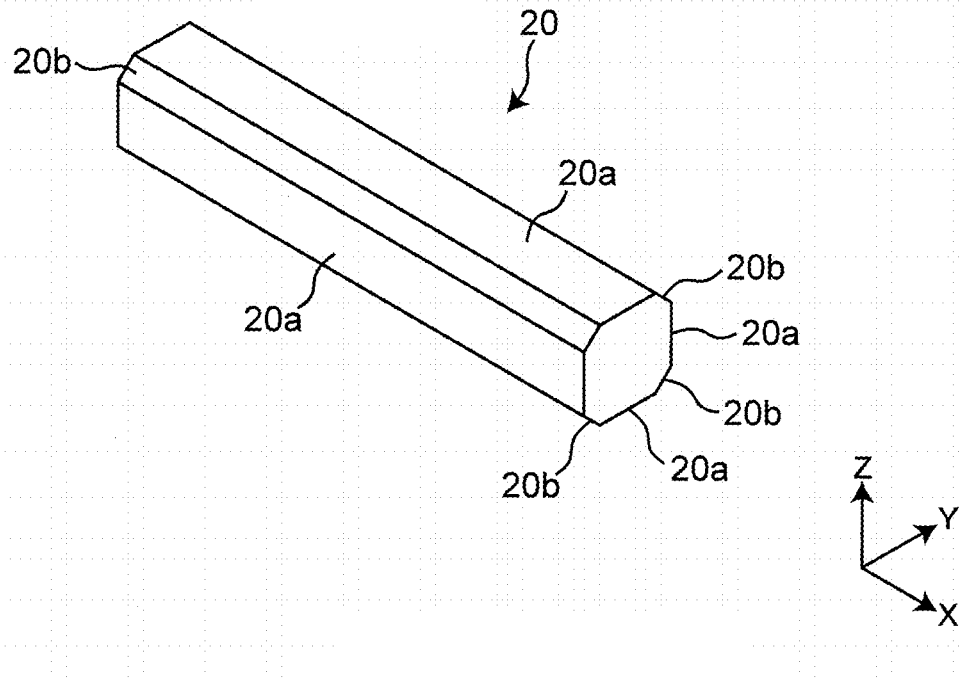
FIG. 8 is a perspective view showing an exemplary variation example of the RFIC module in the RFID tag.

For example, although the RFIC module 20 is a substantially rectangular parallelepiped block body in the embodiment described above as shown in FIG. 3, the exemplary embodiments of the present invention are not limited thereto in an alternative aspect. For example, as shown in FIG. 8, four side surfaces 20a for winding the antenna member therearound may have chamfered portions 20b formed between the side surfaces 20a adjacent to each other. If the chamfered portions 20b are not formed, the antenna member is possibility cut by an edge between the side faces 20a if the linen with the RFID tag attached thereto is repeatedly washed, for example. By disposing the chamfered portions 20b, the cutting of the antenna member can be suppressed.

Figure 9:
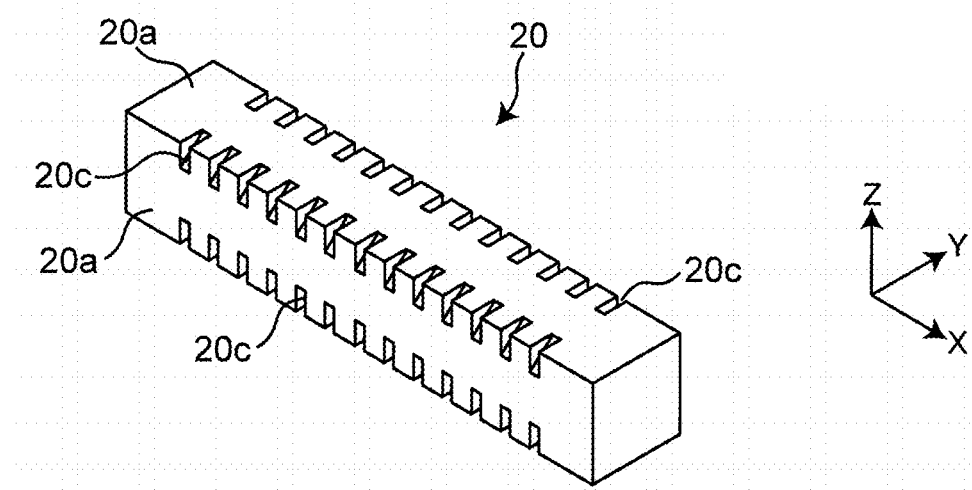
FIG. 9 is a perspective view showing another exemplary variation of the RFIC module in the RFID tag.

In the RFIC module 20 of another exemplary variation shown in FIG. 8, the chamfered portions 20b are each made up of a flat surface continuous in the longitudinal direction (X-axis direction) of the RFIC module 20. Alternatively, as shown in FIG. 9, chamfered portions may intermittently be formed of multiple notches 20c between the side surfaces 20a. By forming the multiple notches 20c at equal intervals and disposing the antenna member in the notches 20c, the antenna member can be wound around the RFIC module 20 at constant pitch intervals. As a result, communication characteristics can be prevented from varying among multiple RFID tags (communication characteristics can be prevented from varying due to a difference in the pitch interval or the number of turns).

Figure 10:
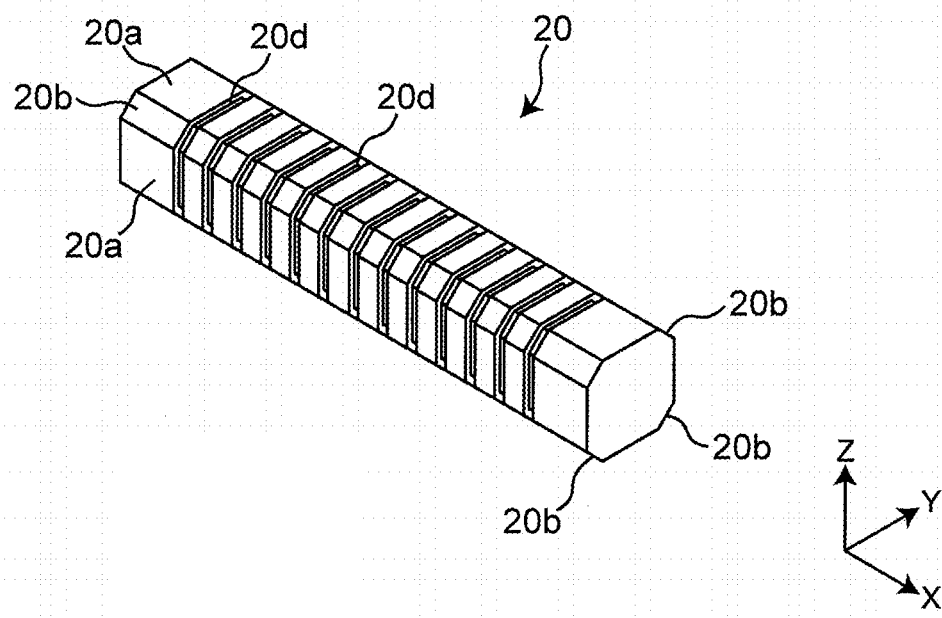
FIG. 10 is a perspective view showing a further exemplary variation of the RFIC module in the RFID tag.

Alternatively, as shown in FIG. 10, while the chamfered portions 20b each made up of a flat surface continuous in the longitudinal direction (X-axis direction) of the RFIC module 20 are formed between the adjacent side surfaces 20a of the RFIC module 20, circumferential grooves 20d for disposing the antenna member may be formed.

Figure 11:
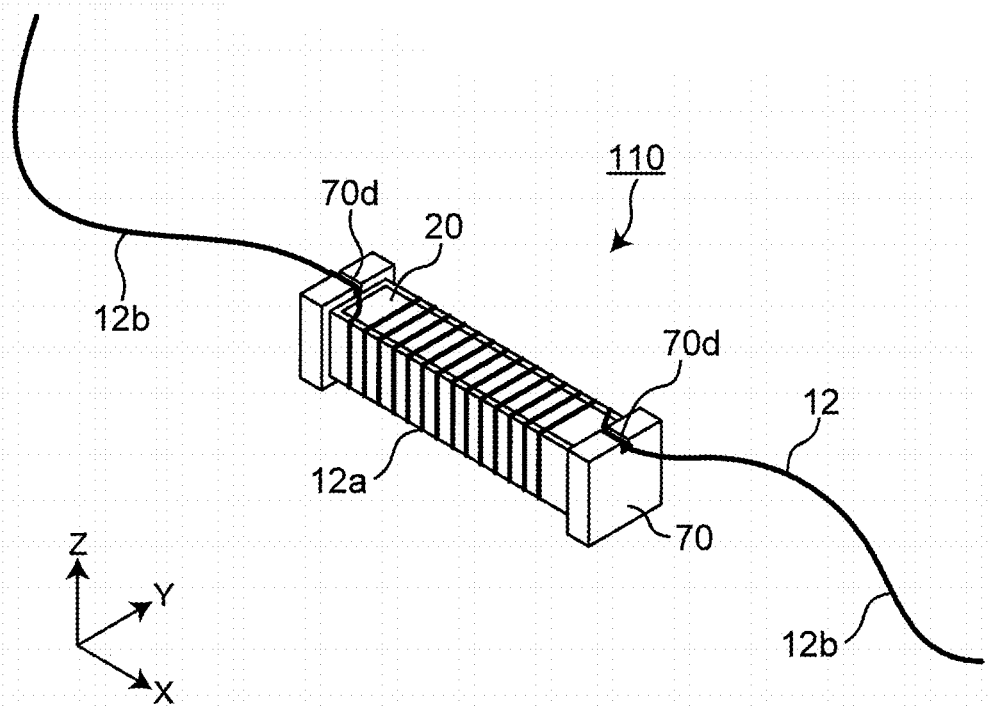
FIG. 11 is a perspective view of an RFID tag according to another exemplary embodiment.

For example, FIG. 11 shows an RFID tag according to another exemplary embodiment.

As shown in FIG. 11, an RFID tag 110 according to the other embodiment includes a spool-shaped member 70 housing the RFIC module 20 and having the antenna member 12 wound therearound.

Figure 12:
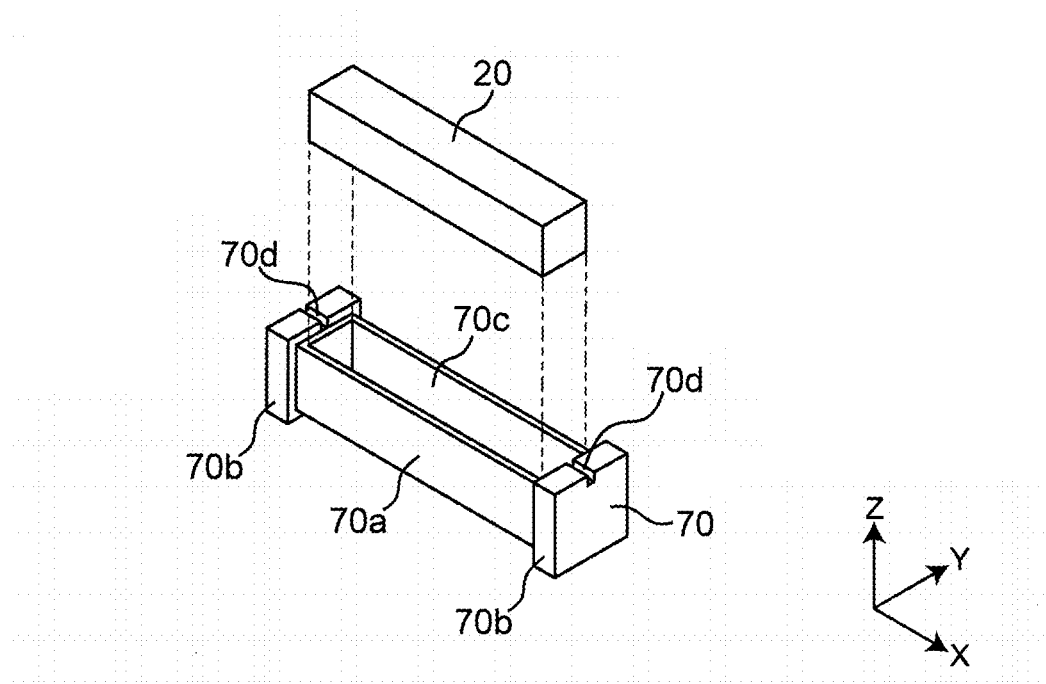
FIG. 12 is a perspective view of a spool-shaped member used in the RFID tag according to the other exemplary embodiment.

As shown in FIG. 12, the spool-shaped member 70 of the RFID tag 110 is made of a resin material, for example, and has a central part 70a around which the antenna member 12 is wound and an end wall part 70b disposed at each end of the central portion 70a. Additionally, a concave-shaped housing part 70c capable of housing the RFIC module 20 is formed in the central part 70a of the spool-shaped member 70. Furthermore, a groove-shaped thread retaining part 70d is formed in each of the end wall parts 70b of the spool-shaped member 70 to engage with and hold the antenna member 12.

After the RFIC module 20 is housed in the housing part 70c of the spool-shaped member 70, a portion of the antenna member 12 is wound around the central part 70a. The antenna member 12 is then fixed to the thread retaining part 70d. As a result, the RFIC module 20 is prevented from falling off the spool-shaped member 70. The RFIC module 20 is protected by the spool-shaped member 70. For example, the spool-shaped member 70 prevents the RFIC module 20 from being lost or damaged during washing of linen to which the RFID tag 110 is attached.

According to the exemplary embodiment described above, as shown in FIG. 2, the portions (radiating parts) 12b of the antenna member 12 excluding the helical coupling part 12a is sewn to the article W in a meander shape. However, the pattern of sewing of the antenna member to the article is not limited to the meander shape.

Figure 13:
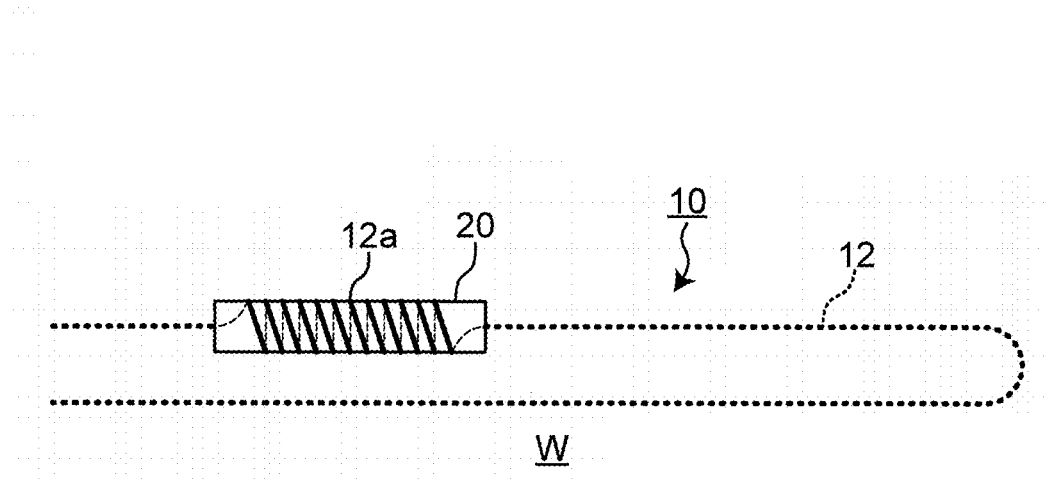
FIG. 13 is a view showing a sewing pattern of another example of an antenna member in the RFID tag.

For example, as shown in FIG. 13, the antenna member 12 formed into a U shape may be sewn to the article W in a shape making the length of the radiation parts equal to the wavelength of the communication frequency. This enables the antenna member 12 to function as a folded-dipole antenna. By designing a folded dipole antenna having a frequency slightly shifted to the higher frequency side relative to a predetermined frequency, the folded dipole antenna acts as an antenna emitting both a magnetic field and an electric field, so that the RFID tag works even when the periphery of the antenna is wet with water.

Figure 14:
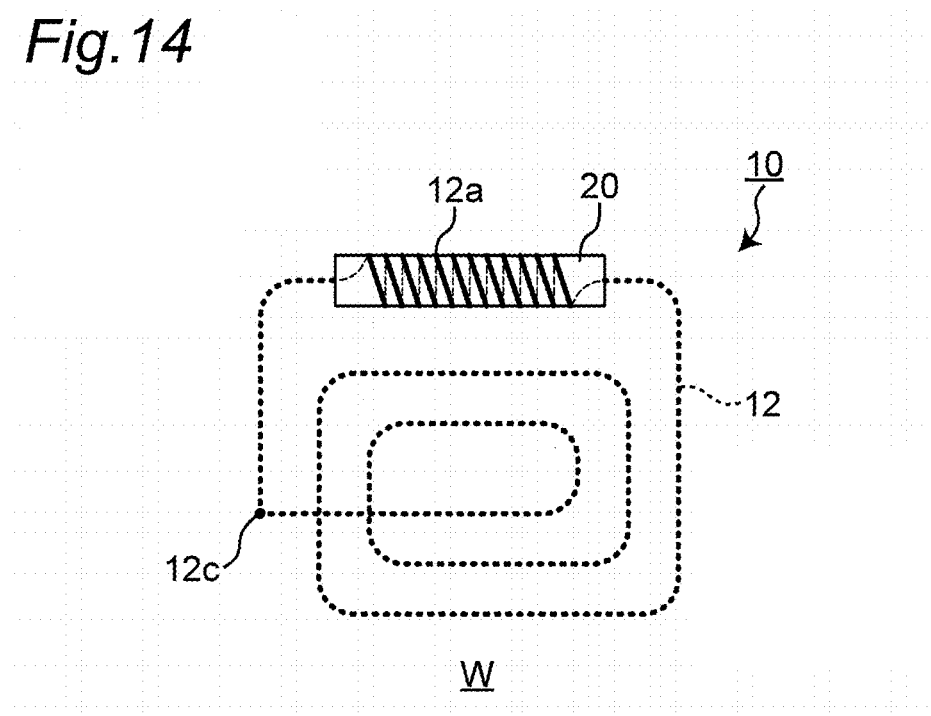
FIG. 14 is a view showing a further sewing pattern of the antenna member in the RFID tag.

For example, as shown in FIG. 14, the antenna member 12 may be sewn to the article W in a spiral shape. In this case, both ends of the antenna member 12 are connected at a connection point 12c.

Figure 15:
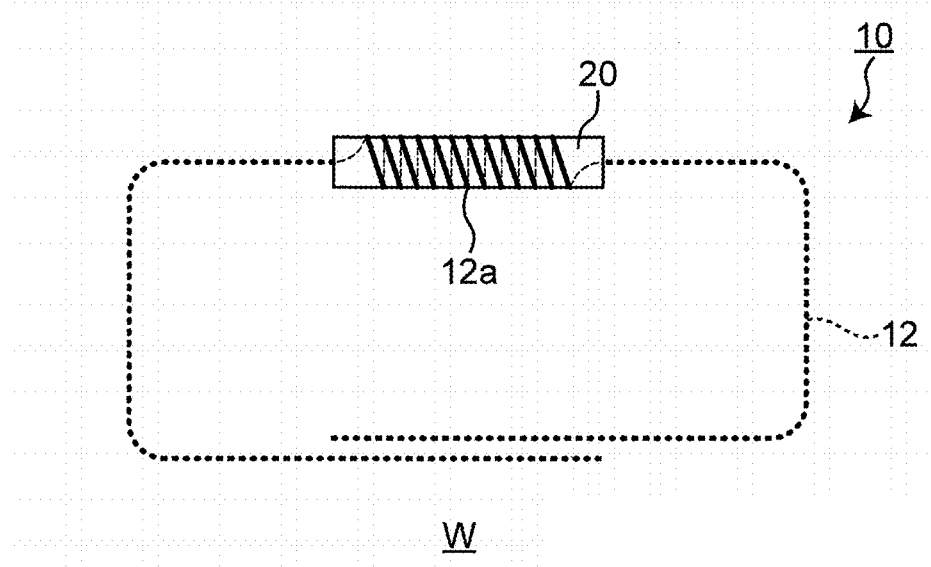
FIG. 15 is a view showing a different sewing pattern of the antenna member in the RFID tag.
Figure 16:
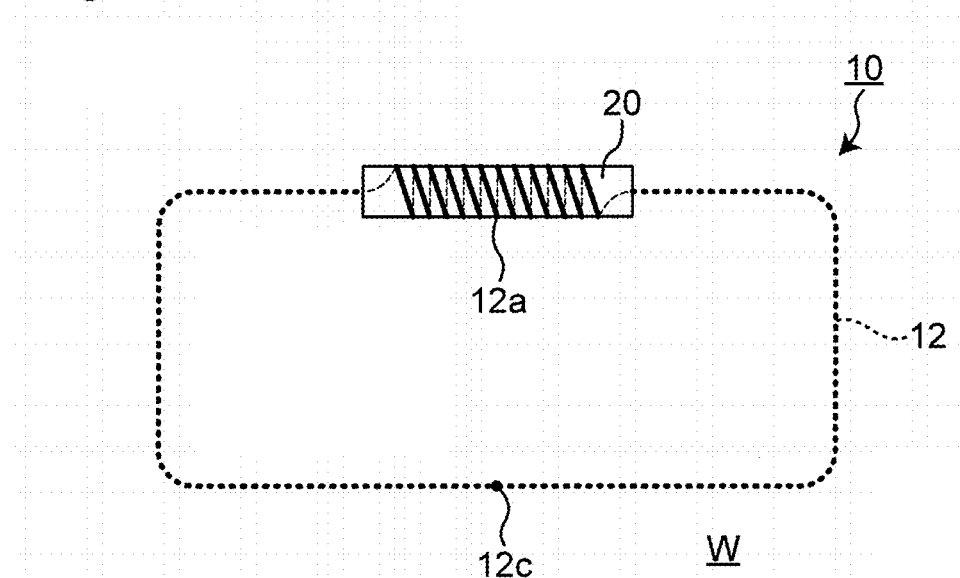
FIG. 16 is a view showing a further different sewing pattern of the antenna member in the RFID tag.

Furthermore, for example, if the RFID tag 10 is formed as a UHF-band magnetic field antenna, as shown in FIG. 15, the antenna member 12 may be sewn to article W in a loop shape. This allows portions near antenna tips of the antenna member 12 to capacitively couple to each other, so that the antenna member 12 functions as a magnetic field loop antenna. In this case, the length of the portion of the antenna member 12 excluding the helical coupling part 12a is made substantially equal to the wavelength of the communication frequency used by the RFID tag 10. As shown in FIG. 16, both ends of the antenna member 12 may be connected at the connection points 12c to form a loop. The RFID tag is attached to clothes, for example. The RFID tag must operate as an antenna even when the clothes contain water due to washing etc. The magnetic field antenna can operate even when clothes are wet and is therefore suitable for management of clothes etc.

Furthermore, according to the exemplary embodiment described above, as shown in FIG. 7, the helical coupling part 12a of the antenna member 12 and the RFIC module 20 (the helical coils 24A, 24B thereof) are not connected in terms of a direct current although forming a magnetic field coupling. To achieve an increased communication distance, the helical coupling part of the antenna member and the helical coils 24A, 24B of the RFIC module 20 may be connected in terms of a direct current.

Figure 17:
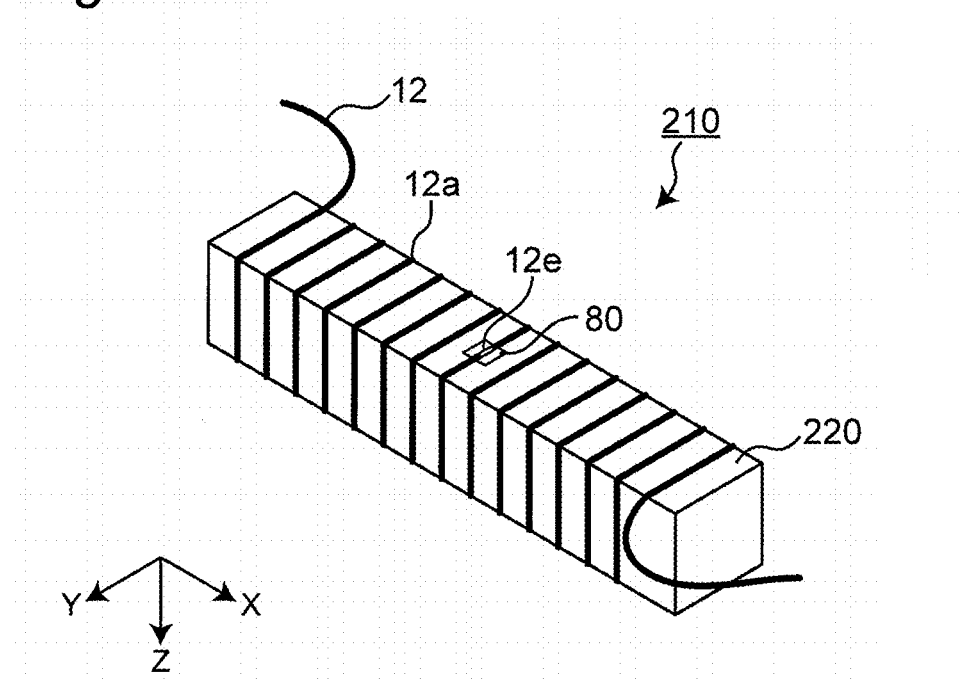
FIG. 17 is a perspective view of an RFID tag according to a further exemplary embodiment.

FIG. 17 shows an RFID tag according to another exemplary embodiment.

As shown in FIG. 17, in an RFID tag 210 according to this exemplary embodiment, an RFIC module 220 includes an external terminal 80 for direct-current connection to the antenna member 12. For direct-current connection to the external terminal 80, the antenna member 12 includes an exposed portion 12e in which a coating material is peeled off to expose a conductor.

FIGS. 18A and 18B show conductor patterns on the principal surface 26a and conductor patterns on the back surface 26b of the printed wiring board 26 in the RFIC module 220. In the RFIC module 220, the constituent elements substantially the same as the constituent elements of the RFIC module 20 of the embodiment described above are denoted by the same reference numerals.

The external terminal 80 of the RFIC module 220 is connected to a land 82 disposed on the back surface 26b of the printed wiring board 26. The land 82 is connected via an interlayer connection conductor 84 to the conductor pattern 38 on the principal surface 26a of the printed wiring board 26, i.e., the conductor pattern 38 connecting the helical coils 24A, 24B. The exposed portion 12e of the antenna member 12 can be connected through the external terminals 80, the land 82, and the interlayer connection conductor 84 to the helical coils 24A, 24B of the RFIC module 220 in terms of a direct current. As a result, the helical coupling part 12a of the antenna member 12 is coupled through a magnetic field to and connected in terms of a direct current to the helical coils 24A, 24B of the RFIC module 220, which consequently makes the communication distance of the RFID tag 210 longer as compared to the case of the magnetic field coupling only.

Moreover, the direct-current connection between the helical coupling part of the antenna member and the helical coils of the RFIC module may be achieved at multiple positions.

Figure 19:
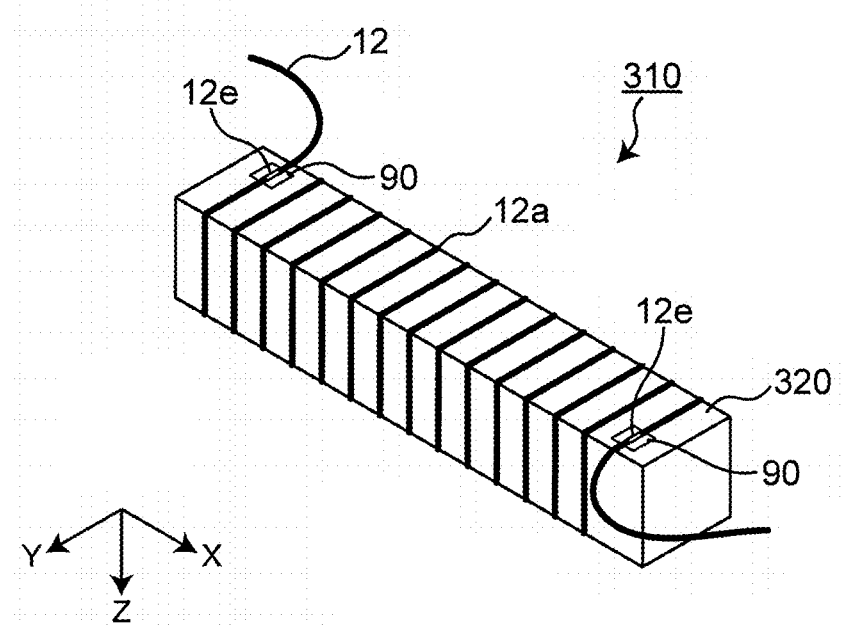
FIG. 19 is a perspective view of an RFID tag according to a different exemplary embodiment.

For example, FIG. 19 shows an RFID tag according to another exemplary embodiment in which a helical coupling part of an antenna member and an RFIC module are connected at multiple positions in terms of a direct current.

As shown in FIG. 19, an RFIC module 320 of an RFID tag 310 according to the different embodiment includes two external terminals 90 for direct-current connection to the antenna member 12. For direct-current connection to the two external terminals 90, the antenna member 12 includes two exposed portions 12e in which a coating material is peeled off to expose a conductor.

Figure 20:
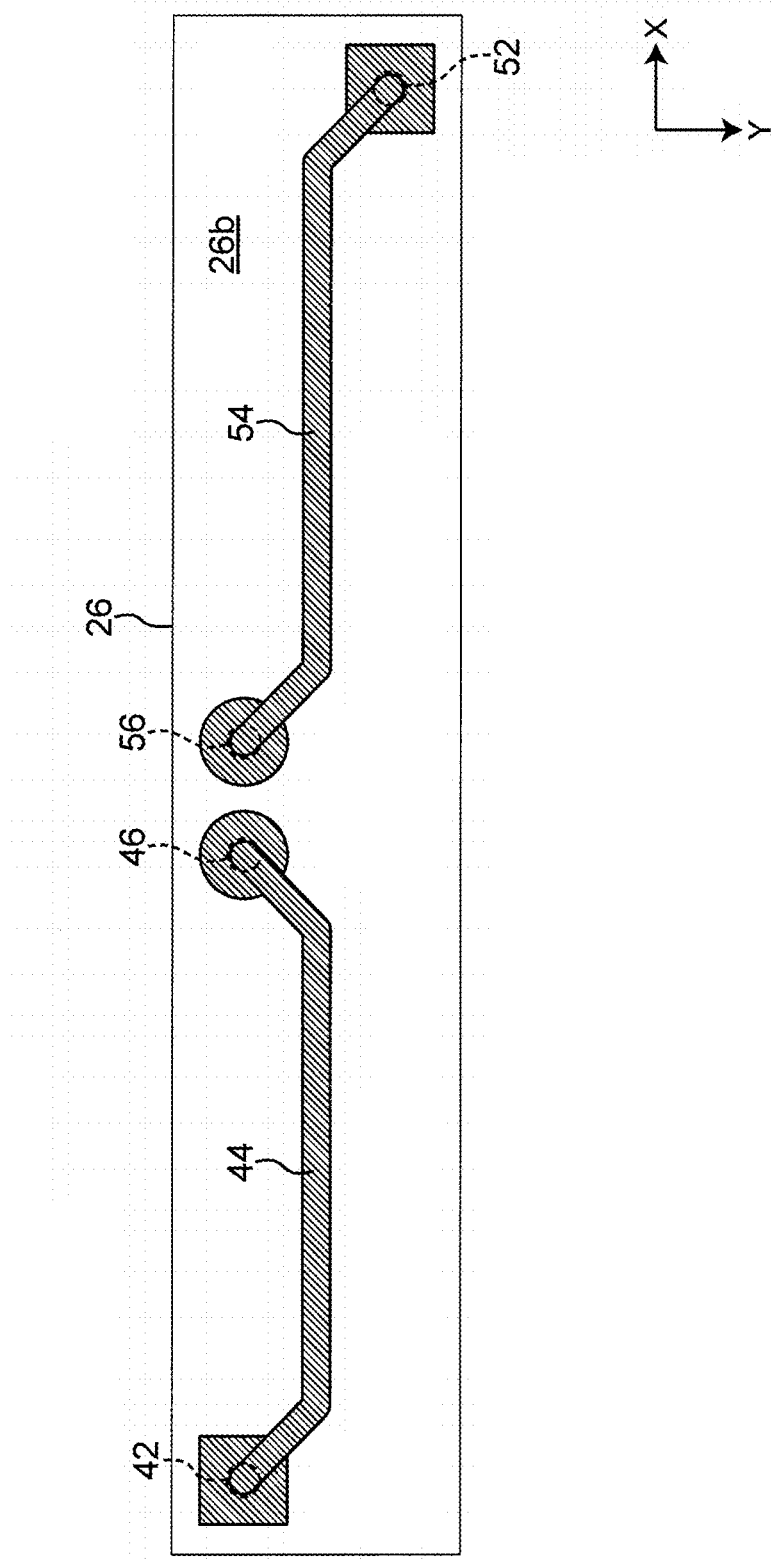
FIG. 20 is a view showing a conductor pattern formed on the principal surface of the printed wiring board in the RFID tag shown in FIG. 19.

FIG. 20 shows conductor patterns on the back surface 26b of the printed wiring board 26 in the RFIC module 320. In the RFIC module 320, the constituent elements substantially the same as the constituent elements of the RFIC module 20 of the embodiment described above are denoted by the same reference numerals.

The two external terminals 90 of the RFIC module 320 are connected to lands 92 formed at outer ends of the conductor patterns 44, 54 disposed on the back surface 26b of the printed wiring board 26, i.e., outer ends connected to the helical coils 24A, 24B. The two exposed portions 12e of the antenna member 12 can be connected through the external terminals 90 and the lands 92 to the helical coils 24A, 24B of the RFIC module 320 in terms of a direct current.

Furthermore, in the case of the exemplary embodiment described above, the helical coils 24A, 24B of the RFIC module 20 are made up of the multiple conductor patterns 30 disposed on the top surface 28a of the resin block body 28, the multiple conductive patterns 32 disposed on the principal surface 26a of the printed wiring board 26, and the multiple metal pins 34 penetrating the resin block body 28. However, the helical coils according to the embodiments of the present invention are not limited thereto as should be appreciated. For example, multiple conductor patterns may be formed on the principal surface of the printed wiring board, and multiple gate-shaped ("U"-shaped) conductor members each connecting one end of the conductor pattern to the other end of the conductor pattern adjacent thereto may vertically be disposed on the principal surface of the printed wiring board (i.e., the conductor pattern 30 and the metal pins 34 are integrated as one member).

Additionally, in the case of the exemplary embodiment described above, as shown in FIG. 2, the antenna member 12 of the RFID tag 10 is sewn to the article W that is a cloth product such as linen. However, the embodiments of the present invention are not limited thereto. For example, the antenna member may be sewn to a resin sheet.

Specifically, in a broad sense, the RFID tag according to the exemplary embodiments of the present invention includes an RFIC module including an RFIC chip and a helical coil connected to the RFIC chip, and an antenna member that is a threadlike conductor having a portion helically wound on the RFIC module around a winding axis extending parallel to an extending direction of a coil axis of the helical coil.

Although the present invention has been described with a plurality of embodiments, it should be apparent for those skilled in the art that at least one embodiment can entirely or partially be combined with a certain embodiment to form a further embodiment according to the present invention.

EXPLANATIONS OF LETTERS OR NUMERALS

10 RFID tag
12 antenna member
20 RFID module
22 RFIC chip
24A helical coil
24B helical coil

The invention claimed is:

1. An RFID tag comprising:
an RFIC module that includes an RFIC chip and a helical coil coupled to the RFIC chip; and
an antenna member comprising a threadlike conductor having a first portion helically wound on the RFIC module and around a winding axis that extends parallel to a longitudinal direction of a coil axis of the helical coil,
wherein the RFIC module includes an insulating element body, and the RFIC chip and the helical coil are disposed in the insulating element body.

2. The RFID tag according to claim 1, wherein the first portion of the threadlike conductor of the antenna member is wound on the insulating element body.

3. The RFID tag according to claim 1, wherein the RFIC module comprises a printed wiring board with a principal surface extending parallel to the longitudinal direction.

4. The RFID tag according to claim 3, wherein the winding axis of the antenna member extends parallel to the principal surface of the printed wiring board.

5. The RFID tag according to claim 3, wherein the helical coil comprises first and second helical coils disposed on the principal surface of the printed wiring board.

6. The RFID tag according to claim 5, wherein the RFIC chip is disposed in a center of the principal surface of the printed wiring board and coupled between the first and second helical coils.

7. The RFID tag according to claim 1, wherein the threadlike conductor of the antenna member further comprises a second portion configured to be sewn to an article.

8. The RFID tag according to claim 1, wherein the first portion of the threadlike conductor has a coil axis that extends parallel to a coil axis of the helical coil.

9. An RFID tag comprising:
an RFIC module that includes an RFIC chip and a helical coil coupled to the RFIC chip;
an antenna member comprising a threadlike conductor having a first portion helically wound on the RFIC module and around a winding axis that extends parallel to a longitudinal direction of a coil axis of the helical coil; and
a spool-shaped member housing the RFIC module and having the antenna member wound there around,
wherein the spool-shaped member has first and second ends each provided with a thread retaining part configured to fix the antenna member to the spool-shaped member.

10. An article comprising:
a cloth material; and
an RFID tag that includes:
an RFIC module having an RFIC chip and a helical coil coupled to the RFIC chip, and
an antenna member comprising a threadlike conductor having a first portion helically wound on the RFIC module around a winding axis that extends parallel to a longitudinal direction of a coil axis of the helical coil and a second portion sewn to the cloth material of the article,
wherein the RFIC module includes an insulating element body, and the RFIC chip and the helical coil are disposed in the insulating element body with the first portion of the threadlike conductor wound on the insulating element body.

11. The article according to claim 10,
wherein the RFIC module comprises a printed wiring board with a principal surface extending parallel to the longitudinal direction, and
wherein the winding axis of the antenna member extends parallel to the principal surface of the printed wiring board.

12. The article according to claim 11, wherein the helical coil comprises first and second helical coils disposed on the principal surface of the printed wiring board.

13. The article according to claim 12, wherein the RFIC chip is disposed in a center of the principal surface of the printed wiring board and coupled between the first and second helical coils.

14. The article according to claim 10, wherein the first portion of the threadlike conductor has a coil axis that extends parallel to a coil axis of the helical coil.

15. An article comprising:
a cloth material; and
an RFID tag that includes:
an RFIC module having an RFIC chip and a helical coil coupled to the RFIC chip,
an antenna member comprising a threadlike conductor having a first portion helically wound on the RFIC module around a winding axis that extends parallel to a longitudinal direction of a coil axis of the helical coil and a second portion sewn to the cloth material of the article, and
a spool-shaped member housing the RFIC module and having the antenna member wound there around,
wherein the spool-shaped member has first and second ends each provided with a thread retaining part configured to fix the antenna member to the spool-shaped member.

16. A method of manufacturing an article having an RFID tag, comprising:
helically winding a first portion of an antenna member comprising a threadlike conductor on an RFIC module that includes an RFIC chip and a helical coil connected to the RFIC chip around a winding axis that extends parallel to a longitudinal direction of a coil axis of the helical coil;
forming an insulating element body for the RFIC module, such that the RFIC chip and the helical coil are disposed in the insulating element body; and
sewing a second portion of the antenna member to the article.

17. The method according to claim 16, further comprising winding the first portion of the threadlike conductor of the antenna member on the insulating element body.

* * * * *